United States Patent [19]

Taub et al.

[11] Patent Number: 4,794,410

[45] Date of Patent: Dec. 27, 1988

[54] BARRIER STRUCTURE FOR THERMAL INK-JET PRINTHEADS

[75] Inventors: Howard H. Taub, San Jose, Calif.; Gordon D. Denler, Monmouth, Oreg.

[73] Assignee: Hewlett-Packard Company, Palo Alto, Calif.

[21] Appl. No.: 57,573

[22] Filed: Jun. 2, 1987

[51] Int. Cl.$^{4}$ .............................................. G01D 15/18

[52] U.S. Cl. .................................. 346/140 R; 346/1.1

[58] Field of Search ................................. 346/140, 1.1

[56] References Cited

U.S. PATENT DOCUMENTS

| | | | |
|---|---|---|---|
| 4,438,191 | 3/1984 | Cloutier | 346/140 X |
| 4,490,728 | 12/1984 | Vaught | 346/140 X |
| 4,502,060 | 2/1985 | Rankin | 346/140 |
| 4,503,444 | 3/1985 | Tacklind | 346/140 |
| 4,542,389 | 9/1985 | Allen | 346/140 |
| 4,550,326 | 10/1985 | Allen | 346/140 |
| 4,558,333 | 12/1985 | Sugitani | 346/140 |
| 4,587,534 | 5/1986 | Saito et al. | 346/140 |
| 4,590,482 | 5/1986 | Hay | 346/140 X |
| 4,611,219 | 9/1986 | Sugitani | 346/140 |
| 4,675,693 | 6/1987 | Yano | 346/140 X |
| 4,723,129 | 2/1988 | Endo | 346/140 X |
| 4,725,859 | 2/1988 | Shibata | 346/140 |

*Primary Examiner*—Joseph W. Hartary

*Attorney, Agent, or Firm*—William J. Bethurum

[57] ABSTRACT

A three-sided barrier structure (22), comprising three walls (24*a*–*c*), is provided in conjunction with a resistor (10) used in a thermal ink-jet printhead. Placement of the structure less than about 25 μm from the resistor results in longer resistor life and an improvement in the static bubble purging ability of the printhead.

12 Claims, 1 Drawing Sheet

BARRIER STRUCTURE FOR THERMAL INK-JET PRINTHEADS

TECHNICAL FIELD

The present invention relates to ink-jet printers, and, more particularly, to improved thermal ink-jet printheads employed in such printers.

BACKGROUND ART

In thermal ink-jet printheads, thin film resistors are employed as heaters to form a bubble of ink over the resistor surface. The growth and collapse of the bubble causes an ink droplet to be ejected from an orifice associated with the resistor. The ejected droplet of ink is directed toward a medium, such as paper.

At a predetermined time, as determined by a signal sent to the printer from, say a computer, the resistor is heated (by $I^2R$ heating) to a temperature sufficient to vaporize a thin layer of ink directly over the resistor, which rapidly expands into a bubble. This expansion, in turn, causes part of the ink remaining between the resistor and the orifice to be expelled through the orifice toward the medium. In present use, the resistor is heated to provide a surface temperature of a few hundred degrees, at repetition frequencies up to 50 kHz and above. However, heating of the resistor itself lasts less than about 10 $\mu$sec.

The presence of wall-like structures, commonly called "barriers", in the immediate vicinity of a thermal ink-jet resistor has significant effects on the performance of the device.

When a vapor bubble collapses over a resistor which has no barrier structure in its immediate vicinity (barriers which are several mils away have little effect), the event approximately has axial symmetry with the final collapse point at the center of the resistor. In this case, fluid can flow freely from all directions as the bubble collapses.

When a wall or barrier is placed near the resistor, refill cannot occur from this direction, thus the bubble appears to be pushed towards the wall by fluid filling from all other directions. A single-sided barrier structure for an array of resistors is impractical to implement, since it would not actually isolate adjacent resistors, which is the original function of the barrier. A two-sided barrier configuration causes refill to occur from two directions; the final stages of bubble collapse occurs in an approximate line across the center of the resistor. Thus, the single collapse point (which in practice may be a small area) is spread into a line which reduces the rate or magnitude of impacting at any one point on the line. However, the bubble collapse attained does permit bubble collapse on the resistor and does permit refill to occur from more than one direction.

Three-sided barriers have been shown, but due to their configuration, have not resulted in improving resistor life or expulsion of static bubbles. See, for example, U.S. Pats. Nos. 4,502,060; 4,503,444; 4,542,389; and 4,550,326.

DISCLOSURE OF INVENTION

In accordance with the invention, a three-sided barrier structure adjacent a resistor in a thermal ink-jet printhead can provide a number of advantages if placed within certain critical distances. Placement of such barriers less than about 25 $\mu$m from such resistors can provide (1) an increase in the life of a resistor by helping to sweep away the collapsing bubble from the center of the resistor and (2) an improvement in the self-purging by the printhead of static bubbles.

A two-sided barrier structure, if placed less than about 25 $\mu$m from the resistor, also provides an increase in the life of the resistor. However, the self-purging of static bubbles is not as readily attained as for the three-sided barrier structure.

BRIEF DESCRIPTION OF THE DRAWINGS

FIGS. 1A–3D illustrate the collapse of a vapor bubble at the center of a resistor for (1) a resistor with no neighboring barrier structure; (2) a resistor with a two-sided barrier structure in accordance with the invention; and (3) a resistor with a three-sided barrier structure in accordance with the invention.

BEST MODES FOR CARRYING OUT THE INVENTION

Figures 1A, 1B, 1C, 1D, 2A, 2B, 2C, 2D, 3A, 3B, 3C, 3D:
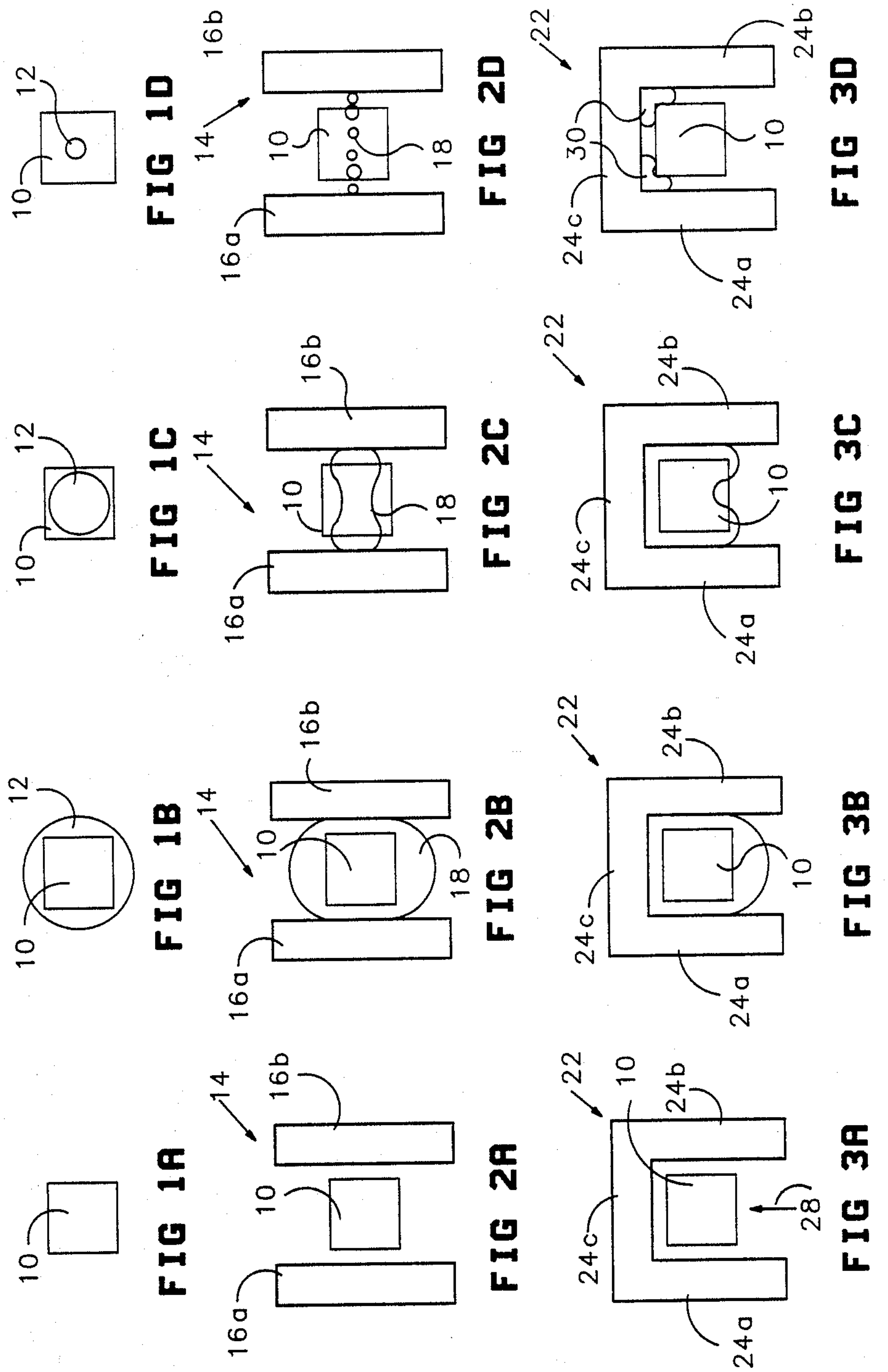

Referring now to the drawings wherein like numerals of reference designate like elements throughout, a resistor 10 is depicted. In the following description, in each case, the ink droplet is ejected normal to the plane of the resistor. This is in contrast to configurations, in which the ink droplet is ejected parallel to the plane of the resistor.

FIG. 1A illustrates a top plan view of a resistor 10 with no neighboring barrier structure. FIGS. 1B–D are line drawings of a portion of a photographic sequence showing how a vapor bubble 12 collapses near the center of the resistor 10. The lifetime of the resistor 10 is typically less than about $20\times10^6$ firings.

FIG. 2A illustrates a top plan view of a resistor 10 with a two-sided barrier structure 14 comprising two walls 16A, 16B, FIGS. 2B–D are line drawings of a portion of a photographic sequence showing a bubble 18 elongating across the width of the resistor 10 as it collapses, finally breaking up into several bubble fragments before vanishing completely.

It is seen that for the two-sided barrier configuration depicted, the bubble collapses in a band across the center of the resistor 10. Such bubble collapse is attained so long as the distance from the edge of the resistor 10 to the wall 16 is less than about 25 $\mu$m, as discussed below in connection with the three-sided barrier structure.

In configurations with distances greater than about 25 $\mu$m, the bubble collapse is similar to that attained with no barrier structure. Thus, the bubble collapse band is an improvement over an essentially bubble collapse point, and accordingly, lifetime of the resistor is increased. For example, the lifetime of the resistor 10 where the walls 16 are greater than about 25 $\mu$m from the resistor is typically less than about $20\times10^6$ firings, while the lifetime of the resistor where the walls are less than about 25 $\mu$m from the resistor may range up to about $100\times10^6$ firings.

However, the bubble does not move off the resistor 10 unless the barriers are offset, that is, closer on one side than on the other. An offset two-sided barrier may, therefore, be acceptable.

While a parallel configuration is depicted, it will be appreciated that non-parallel configurations, as well as variations of parallel configurations, e.g., a "bracket" shape, may also be employed in the practice of the invention.

Finally, static bubble elimination, achieved with the three-sided barrier structure, as described below, is not attained with the two-sided barrier structure 14, even within the indicated distance separation. Nonetheless, since resistor lifetime improvement is attained, this configuration is considered to fall within the scope of the invention.

FIG. 3A illustrates a top plan view of a resistor 10 with a three-sided barrier structure 22 in accordance with the invention. The barrier structure comprises three walls 24A, 24B, 24C. FIGS. 3B–D are line drawings of a portion of a photographic sequence showing a collapsing bubble 26 which is shifted toward the third side 24C of the barrier structure 22 by the refilling liquid (not shown) which enters from the open side of the barrier structure, as indicated by arrow 28. The final stages of bubble collapse take place off the resistor 10, forming bubble fragments 30 along the rear wall 24C.

The three-sided barrier structure 22 of the invention may comprise, for example, a block U-shaped configuration, with the resistor 10 placed in the bight of the U, as depicted in FIG. 3A, or variants thereof, so long as one side remains open for entry of ink, indicated by arrow 28, from an ink reservoir (not shown).

It should be noted that the photographs upon which the line drawings of FIGS. 1B–D, 2B–D and 3B–D are based were for a pond test and that the details of the collapsing bubbles in a completely assembled printhead (with an orifice plate—not shown) may be somewhat different. However, the basic principles would remain the same.

The three-sided barrier structure 22 of the invention should be placed such that none of the walls 24A–C are no further than about 25 μm from the resistor 10. Such placement provides an increase in the life of the resistor 10 by helping to sweep away the collapsing bubble from the center of the resistor, as shown in FIGS. 3B–D. For example, the lifetime of the resistor 10 where the walls 24 are greater than about 25 μm from the resistor is typically less than about $20\times10^6$ firings, while the lifetime of the resistor where the walls are less than about 25 μm from the resistor may range up to about $200\times10^6$ firings. Where the walls 24 are less than about 10 μm from the resistor 10, the lifetime may exceed $200\times10^6$ firings.

Sweeping the collapsing bubble from the center of the resistor 10 increases the life of the resistor, since cavitation, which is a problem with structures of less than three sides, is greatly reduced. Such cavitation results in a shock wave which strikes the same area (typically the central area) on the resistor 10 each time the resistor is pulsed to fire a bubble. The cavitation effect leads to erosion of the bubble collapse area and concomitant early failure of the resistor. This problem is further exacerbated by the fact that the center of the resistor 10 is also the hottest region, and the coincidence of the bubble collapse area with the center of the resistor results in additional erosion.

Use of the three-sided barrier structure 22 of the invention and placement thereof less than about 25 μm from the resistor 10 also provides an improvement in the self-purging by the printhead of static bubbles. Static bubbles (not shown) contain gases rather than vaporized ink vehicle and enter the head by a variety of mechanisms. Their "collapse", by dissolving back into the ink, can take from about 10 to $10^9$ times longer than vapor bubbles, depending on their size.

Preferably, the barrier 22 should be within about 10 μm of the resistor 10, and most preferably within about 5 μm, in order to fully realize the benefits of the sweeping effect. Also, accumulation of microbubbles and growth thereof on the walls 24A–C of the barrier 22 is minimized as the walls are moved closer to the resistor, especially in the range of less than about 10 μm.

Asymmetrical placement of the barrier structure 22 about the resistor 10 is not critical, so long as the maximum distance listed above is not exceeded on any of the three sides adjacent a barrier wall 24. It appears that the smallest distance between the resistor 10 and the wall 24 controls where the bubble will move to. However, it will be remembered that static bubbles tend to be stored in large spaces, so that while some misalignment between the resistor 10 and the barrier structure 22 is acceptable, such misalignment should be minimized.

The barrier structure 22 may comprise suitable polymeric or metallic materials. Examples of such materials include dry film resists, such as Vacrel and Riston, available from E. I. duPont de Nemours (Wilmington, Del.), polyimide compositions, plated nickel, and the like.

The three-sided barrier structure 22 of the invention, with walls 24 within the critical distance of the resistor 10, afford several advantages over one- and two-barrier configurations. First, because refill is from one direction, the collapsing bubble 26 is swept off the resistor toward the "back" barrier wall 24C. There is also a tendency for the bubble 26 to divide into several components 30, which weakens the collapse energy at any given point.

Further, the barrier structure 22 assists the purging of static bubbles which may have several origins: (1) air trapped in the printhead when it is first filled with ink; (2) gases dissolved in the ink which come out of solution; (3) air gulped in from outside during operation due to a meniscus folding back on itself; (4) gaseous products of chemical corrosion; and (5) agglomeration of microbubbles.

With other prior art approaches, when a static bubble resides in the immediate neighborhood of the resistor 10, it receives a strong impulse force every time a vapor bubble exposion occurs; this moves the static bubble to another location. With the three-sided barrier structure 20 of the invention, the bubble is confined to remain in the immediate vicinity of the resistor by three physical walls 24A–C and one virtual wall, which is the refill flow from the fourth direction, shown by arrow 28 in FIG. 3A.

It is also possible for the static bubble to be moved into the fluid region directly above the resistor, in which case it may be ejected from the printhead with the next drop. In fact, this may be expected to happen eventually after some number of impulses.

For one- or two-sided barriers, the static bubble may move away from the resistor to a region where the vapor explosion force cannot influence it (although the static bubble may have a large effect on device operation). It should be noted that this problem is likely to occur with placement of the three-sided barrier 22 at a distance much greater than about 25 μm from the resistor 10, since the bubble can be trapped between the resistor and the barrier wall and not be influenced by vapor bubble explosions.

INDUSTRIAL APPLICABILITY

Two- and three-sided barrier wall configurations associated with resistors used in thermal ink-jet printers, spaced less than about 25 μm from such resistors, are expected to find use in printers to improve resistor life and, in the case of three-sided barrier structures, static bubble purging ability of the printhead.

Thus, two- and three-sided barrier wall configurations, to be used in association with a resistor employed in a thermal ink-jet printhead and spaced no more than about 25 μm from the resistor, have been disclosed. Placement of such barriers within the critical distance from the resistor results in longer resistor life and, in the case of three-sided configurations, an improvement in the static bubble purging ability of the printhead. Many modifications and changes of an obvious nature will make themselve apparent to those of ordinary skill in the art, and all such modifications and changes are deemed to fall within the scope of the invention, as defined by the appended claims.

What is claimed is:

1. A thermal ink-jet printhead including at least one resistor for firing droplets of ink normal to the plane of said resistor toward a medium, characterized by a three-sided barrier structure having three walls and encompassing said resistor to provide an open side for replenishing of ink from a reservoir, each said wall of said barrier structure spaced from said barrier, said spacing being less than about 25 μm from an edge of said resistor.

2. The printhead of claim 1 wherein said walls are connected so as to form a substantially U-shaped structure, encompassing said resistor in the bight thereof.

3. The printhead of claim 1 wherein each said wall is less than about 10 μm from said resistor.

4. The printhead of claim 3 wherein each said wall is less than about 5 μm from said resistor.

5. A method for extending resistor life of a resistor employed in a thermal ink-jet printhead, said resistor adapted to eject droplets of ink normal to the plane of said resistor, said method comprising providing a barrier structure having three walls and placing each wall less than about 25 μm from said resistor, heating said resistor to form a vapor bubble for ejecting a droplet of ink, and collapsing said vapor bubble and sweeping said collapsing vapor bubble away from the center of said resistor thereby extending the life of said resistor.

6. The method of claim 5 wherein said walls are connected so as to form a substantially U-shaped structure, encompassing said resistor in the bight thereof.

7. The method of claim 5 wherein each said wall is placed less than about 10 μm from said resistor.

8. The method of claim 7 wherein each said wall is placed less than about 5 μm from said resistor.

9. A method for purging static bubbles from a resistor employed in a thermal ink-jet printhead, said resistor adapted to eject droplets of ink normal to the plane of said resistor, said method comprising providing a barrier structure having three walls and placing each wall less than about 25 μm from said resistor, heating said resistor to form a vapor bubble for ejecting a droplet of ink, collapsing said vapor bubble and sweeping away said collapsing vapor bubble, and self-purging static bubbles by confining said static bubbles to the immediate vicinity of said resistor.

10. The method of claim 9 wherein said walls are connected so as to form a substantially U-shaped structure, encompassing said resistor in the bight thereof.

11. The method of claim 9 wherein each said wall is placed less than about 10 μm from said resistor.

12. The method of claim 11 wherein each said wall is placed less than about 5 μm from said resistor.

* * * * *